US006543423B2

(12) United States Patent
Dobryden et al.

(10) Patent No.: US 6,543,423 B2
(45) Date of Patent: Apr. 8, 2003

(54) CONTROL SYSTEM AND METHOD FOR A BI-FUEL ENGINE

(75) Inventors: Allen Dennis Dobryden, Ann Arbor, MI (US); John Milton Lapetz, Northville, MI (US); Peter Douglas Kuechler, Canton, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/911,328

(22) Filed: Jul. 23, 2001

(65) Prior Publication Data

US 2003/0015178 A1 Jan. 23, 2003

(51) Int. Cl.[7] ............................................. F02M 51/00
(52) U.S. Cl. ...................... 123/480; 123/575; 123/1 A
(58) Field of Search .................... 123/1 A, DIG. 12, 123/480, 486, 304, 575

(56) References Cited

U.S. PATENT DOCUMENTS

| | | | | |
|---|---|---|---|---|
| 5,092,305 A | * | 3/1992 | King | ........................... 123/1 A |
| 5,832,905 A | | 11/1998 | King et al. | |
| 6,050,237 A | * | 4/2000 | Ferrera et al. | .......... 123/27 GE |
| 6,076,487 A | * | 6/2000 | Wulff et al. | ................. 123/1 A |
| 6,105,561 A | | 8/2000 | Ferrera et al. | |
| 6,250,260 B1 | * | 6/2001 | Green | .................... 123/27 GE |
| 6,298,838 B1 | * | 10/2001 | Huff et al. | .................... 123/575 |
| 6,332,448 B1 | * | 12/2001 | Ilyama et al. | ................ 123/304 |

FOREIGN PATENT DOCUMENTS

| | | |
|---|---|---|
| EP | 0723073 A2 | 7/1996 |
| EP | 0922843 A2 | 6/1999 |
| WO | WO 00/41905 | 7/2000 |

* cited by examiner

*Primary Examiner*—John Kwon
(74) *Attorney, Agent, or Firm*—John F. Buckert; Allan J. Lippa

(57) ABSTRACT

A control system 14 for a bi-fuel engine 12 is provided. The control system 14 includes a powertrain controller 52 and a bi-fuel controller 54. The controller 52 has a set of fuel injector drivers 92. The controller 50 has a set of gasoline fuel injector drivers 104 and a set of alternate fuel (AF) fuel injector drivers 106. Each of drivers 92 in controller 52 is electrically connected to a driver 104 and a driver 106 in controller 50. Thus, a control signal generated by a single driver 92 can be utilized by either of drivers 104, 106 to generate a corresponding control signal for controlling a gasoline fuel injector 38 or a AF fuel injector 40, respectively.

19 Claims, 3 Drawing Sheets

CONTROL SYSTEM AND METHOD FOR A BI-FUEL ENGINE

FIELD OF THE INVENTION

The invention relates to a control system and method for controlling fuel delivery to an internal combustion engine. More particularly, the invention relates to a control system and method that delivers one of two different fuel types to an engine capable of combusting either of the fuel types.

BACKGROUND OF THE INVENTION

Powertrain controllers have long been used to control fuel delivery to engine cylinders. For engines having fuel injectors, the powertrain controllers have fuel injector drivers that generate control signals to control the amount of fuel delivered by the fuel injectors. In particular, the controller has one fuel injector driver for each fuel injector. Generally, the controller generates the control signals based on fuel maps that are stored in a memory of the controller.

Bi-fuel engines have been developed that can combust two or more different types of fuel. For example, bi-fuel engines have been developed that can combust (i) gasoline or (ii) alternate fuels such as compressed natural gas (CNG) or liquefied petroleum gas (LPG). Further, bi-fuel engines utilize two different types of fuel injectors, one type for delivering gasoline and a second type for delivering alternate fuels. Thus, for a four-cylinder bi-fuel engine, four fuel injectors (and corresponding drivers) would be utilized for delivering gasoline to the engine cylinders and four additional fuel injectors (and corresponding drivers) would be utilized for delivering an alternate fuel to the engine cylinders.

When designing bi-fuel engines, it is generally desirable to utilize as many pre-existing controllers and components as possible to reduce development costs and time. Thus, designers may use a previously designed powertrain controller for controlling gasoline fuel delivery in conjunction with an alternate fuel controller for controlling fuel delivery of an alternate fuel (AF). However, this approach raises the following problems. Generally, the alternate fuel controllers are designed by third party manufacturers and have substantially different control strategies for fuel delivery as compared to the powertrain controller. Thus, because different fuel control methodologies are utilized in both controllers, engine designers have increased difficulty meeting lower vehicle emission standards.

Engine designers have alternatively designed new powertrain controllers that can handle both the gasoline fuel delivery and alternate fuel delivery to a bi-fuel engine. In particular, new powertrain controllers have been designed having two sets of fuel injector drivers, one set for controlling gasoline fuel injectors and one set for controlling AF fuel injectors. However, the costs associated with designing new powertrain controllers having a predetermined number of gasoline and AF fuel injector drivers for each new bi-fuel engine is prohibitively expensive.

SUMMARY OF THE INVENTION

The above-identified disadvantages of conventional control systems are substantially overcome by a control system and method described and claimed herein.

The control system can control fuel delivery of two types of fuel to a bi-fuel engine. The two types of fuel may comprise any conventional fuel types that can be combusted in a bi-fuel engine. For example, a first fuel type may comprise either gasoline or diesel, and, a second fuel type may comprise CNG, LPG, or compressed hydrogen. The engine includes first and second fuel injectors for injecting first and second fuel types, respectively, into an engine cylinder. The control system includes a first controller (e.g., a powertrain controller) having a first driver generating a first signal indicative of a desired fueling amount for one of the first and second fuel types, respectively. The control system further includes a second controller (e.g., a bi-fuel controller) receiving the first signal. The second controller including second and third drivers for controlling the first and second fuel injectors, respectively. The second driver generating a second signal for controlling an amount of the first fuel type injected by the first fuel injector based on the first signal. The third driver generating a third signal for controlling an amount of the second fuel type injected by the second fuel injector into the cylinder based on the first signal. Generally, only one of the fuel types will be injected in the engine cylinders during a combustion cycle. It should be understood, however, that the control system is capable of injecting two fuel types into the engine cylinders during a combustion cycle.

A method of controlling an engine capable of combusting first and second fuel types in accordance with the present invention is provided. The engine having first and second fuel injectors for injecting the first and second fuel types, respectively, into an engine cylinder. The method includes generating a first signal indicative of a desired fueling amount for one of the first and second fuel types where the first signal is generated by a first controller (e.g., powertrain controller). The method further includes generating a second signal for controlling an amount of the first fuel type injected by the first fuel injector based on the first signal, when the first fuel type is to be combusted, where the second signal is generated by a second controller (e.g., bi-fuel controller).

The control system and method for controlling fuel delivery to a bi-fuel engine in accordance with the present invention provides a substantial advantage over conventional systems and methods. In particular, the control system provides a powertrain controller that generates control signals for either gasoline or AF fuel injectors, depending on which fuel type is desired to be combusted. Thus, a common control strategy can be utilized in a single controller to control both gasoline and AF fuel injection to meet regulated emission requirements and to improve fuel economy.

Utilizing the second simplified bi-fuel controller also results in substantial cost savings as compared to conventional alternate fuel controllers. As discussed above, the bi-fuel controller includes both gasoline and alternate fuel drivers that control the gasoline and AF fuel injectors based on control signals received from the powertrain controller. Thus, the complex calculations for fuel delivery are not performed in the bi-fuel controller resulting in decreased memory requirements and software complexity as compared to conventional alternate fuel controllers. Further, the bi-fuel controller can be implemented as a "plug-in" module to allow a powertrain controller to double the number of fuel injectors that can be controlled. For example, a powertrain controller having four fuel injector drivers could be utilized with the bi-fuel controller to control four gasoline fuel injectors and four alternate fuel injectors. Thus, an existing powertrain controller designed for controlling gasoline delivery to four engine cylinders, for example, could be adapted to control bi-fuel delivery to the cylinders without adding any additional hardware, except for the simplified bi-fuel controller.

DESCRIPTION OF AN EMBODIMENT

Figure 1:
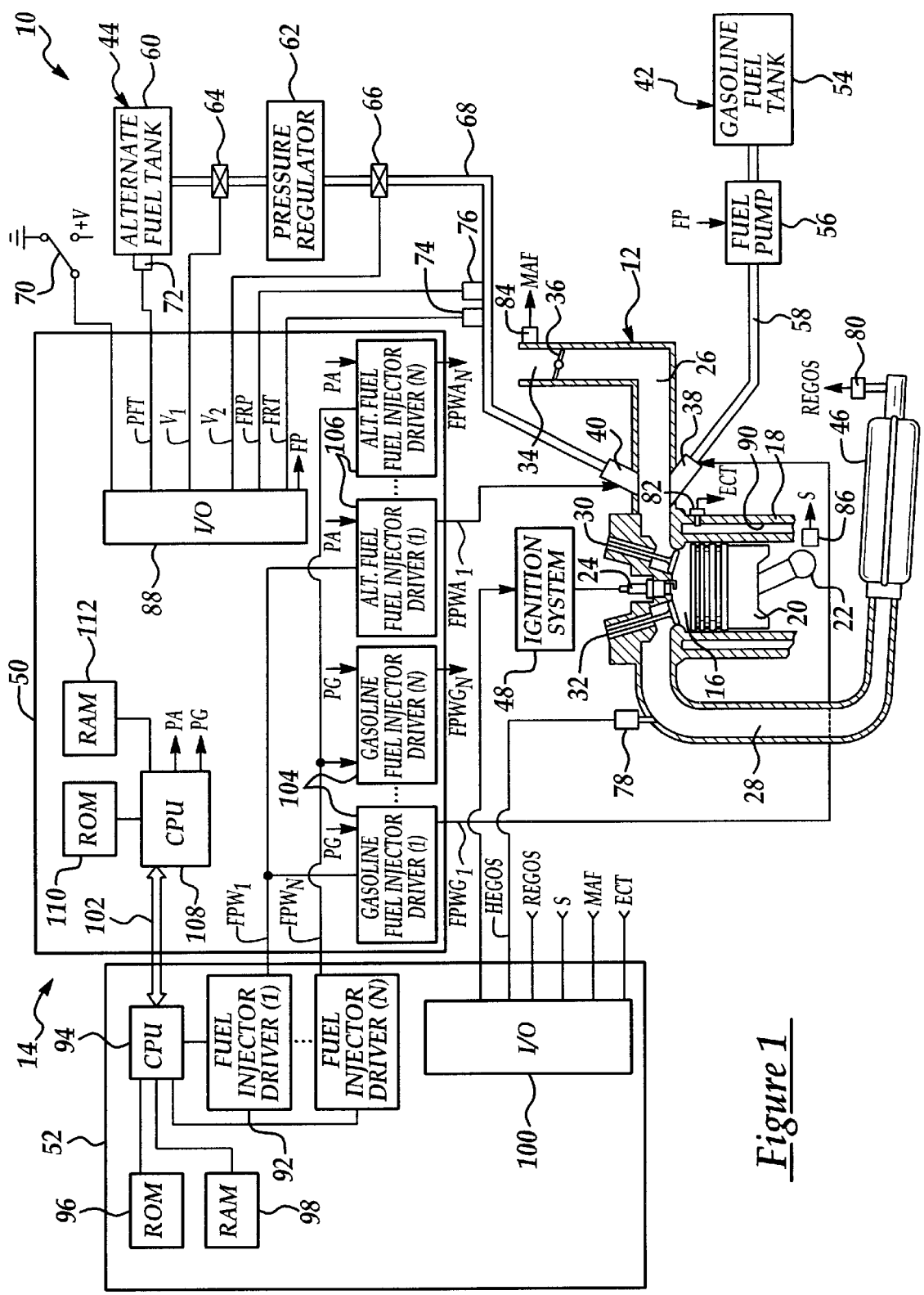
FIG. 1 is a schematic of a bi-fuel engine having a control system in accordance with the present invention.

Referring now to the drawings, like reference numerals are used to identify identical components in the various views. Referring to FIG. 1, an automotive vehicle 10 is shown having an engine 12 capable of bi-fuel operation, and an inventive control system 14 for controlling the delivery of two different fuel types to engine 12. In particular, engine 12 may combust a first fuel such as gasoline or a second alternate fuel such as CNG or LPG. For purposes of discussion, it is assumed that only one fuel type is injected into engine 12 during a combustion cycle. It should be understood, however, that control system 14 could be utilized to inject two fuel types into engine 12 during a combustion cycle.

The engine 12 comprises a plurality of cylinders, one cylinder of which is shown in FIG. 1. Engine 12 further includes a combustion chamber 16, cylinder walls 18, a piston 20, a crankshaft 22, a spark plug 24, an intake manifold 26, an exhaust manifold 28, an intake valve 30, an exhaust valve 32, a throttle body 34, a throttle plate 36, a gasoline fuel injector 38, an AF fuel injector 40, a conventional fuel system 42, an alternate fuel system 44, and a catalytic converter 46.

Combustion chamber 16 communicates with intake manifold 26 and exhaust manifold 28 via respective intake and exhaust valves 30, 32. Piston 20 is positioned within combustion chamber 16 between cylinder walls 18 and is connected to crankshaft 22. Ignition of an air-fuel mixture within combustion chamber 16 is controlled via spark plug 24 which delivers ignition spark responsive to a signal from distributorless ignition system 48.

Intake manifold 26 communicates with throttle body 34 via throttle plate 36 and includes gasoline fuel injector 38 and AF fuel injector 40 coupled thereto. Fuel injectors 38, 40 deliver either gasoline or an alternate fuel, respectively, in proportion to the pulse width of signals $(FPWG_1)$, $(FPWA_1)$, respectively, from bi-fuel controller 50. As will be discussed in further detail below, signals $(FPWG_1)$, $(FPWA_1)$ will be generated responsive to signal $(FPW_1)$ from powertrain controller 52. Further, signals $(FPWG_1)$, $(FPWA_1)$ preferably have the same pulse width as signal $(FPW_1)$.

Gasoline is delivered to fuel injector 38 by conventional fuel system 42. Fuel system 42 includes a fuel tank 54, a fuel pump 56, and a fuel rail 58. Fuel pump 56 is turned on or off responsive to a signal (FP) generated by bi-fuel controller 50.

An alternate fuel type is delivered to fuel injector 40 by alternate fuel system 44 that includes fuel tank 60, a pressure regulator 62, valves 64, 66, and a fuel rail 68. Fuel tank 60 is constructed to hold an alternate fuel such as CNG or LPG under relatively high pressure. Valves 64, 66 are opened or closed responsive to signals (V1), (V2), respectively, from bi-fuel controller 50. When valves 64, 66 are open (e.g., during AF fuel combustion), fuel is delivered from tank 60 through pressure regulator 62 to fuel rail 68 and fuel injector 40. When either of valves 64, 66 is closed (e.g., during gasoline combustion), fuel flow is prevented from entering fuel rail 68.

Exhaust manifold 28 communicates with catalytic converter 46 which reduces exhaust gases such a hydrocarbons (HC), nitrous oxides (NOx), and carbon monoxide (NO).

Control system 14 is provided to control bi-fuel operation of engine 12 in accordance with the present invention. Control system 14 includes a fuel selector switch 70, a fuel level sensor 72, a fuel rail temperature sensor 74, a fuel rail pressure sensor 76, exhaust sensors 78, 80, an engine coolant temperature sensor 82, a mass air flow sensor 84, an engine speed sensor 86, an ignition system 48, powertrain controller 52, and bi-fuel controller 50.

The fuel selector switch 70 is provided to allow an operator to select one of two different fuel types. As illustrated, when switch 70 has a first operational state, switch 70 provides a GND voltage to input-output (I/O) interface 88 indicating a gasoline fuel type is selected for engine operation. Alternately, when switch 70 has a second operational state, switch 70 provides a positive voltage to I/O interface 88 indicating an alternate fuel type is selected (i.e., fuel type stored in tank 60) for engine operation. Thus, bi-fuel controller 50 monitors the voltage from switch 70 using I/O interface 88 to determine the selected fuel type.

Fuel level sensor 72 is provided to determine the amount of alternate fuel in fuel tank 60. If LPG is stored in tank 60, sensor 72 may comprise a conventional float sensor that generates signal (PFT) indicative of the amount of fuel. Alternately, if CNG is stored in tank 60, sensor 72 may comprise a conventional pressure sensor that generates signal (PFT) indicative of the pressure in tank 60 and further indicative of the amount of fuel. As illustrated, signal (PFT) is transmitted to bi-fuel controller 50.

Fuel rail temperature sensor 74 and fuel rail pressure sensor 76 generate signals (FRT), (FRP), respectively, indicative of the temperature and pressure within fuel rail 68. As illustrated, signals (FRT),(FRP) are transmitted to bi-fuel controller 50.

Exhaust gas sensors 78, 80 are conventional in the art and may comprise an EGO, HEGO, or UEGO oxygen sensor. As illustrated, sensor 78 is coupled to exhaust manifold 28 upstream of catalytic converter 46, and sensor 80 is coupled downstream of converter 46. When sensors 78, 80 are HEGO sensors, sensors 78, 80 may generate two-state signals (HEGOS) and (REGOS), respectively. Signals (HEGOS) and (REGOS) may have a predetermined high voltage when measured exhaust gases are rich of stoichiometry and a predetermined low voltage when exhaust gases are lean of stoichiometry. As illustrated, signals (HEGOS), (REGOS) are transmitted to powertrain controller 52.

Engine coolant temperature sensor 82 generates a signal (ECT) indicating the engine coolant temperature which is received by powertrain controller 52. Sensor 82 is conventional in the art and is coupled to the cooling jacket 90 in cylinder wall 18.

Mass air flow sensor 84 generates a signal (MAF) indicating the inducted mass air flow which is received by controller 52. Sensor 84 is conventional in the art and may be coupled to the throttle body 34 or intake manifold 26.

Speed sensor 86 generates a variable reluctance signal (S) indicating engine speed which is received by controller 52. Sensor 86 is conventional in the art and may be coupled to the crankshaft 22.

Distributorless ignition system 48 provides ignition control signals to spark plug 24 to control combustion in combustion chamber 16 responsive to control signals received from controller 52.

The powertrain controller 52 is provided to generate fueling control signals for controlling the amount of fuel delivered to engine 12. In particular, controller 52 utilizes a plurality of fuel injector drivers 92 to generate control signals $(FPW_1)$–$(FPW_N)$ for controlling the amount of fuel injected by (i) (N) number of gasoline fuel injectors 38 or (ii) (N) number of AF fuel injectors 40. The signals $(FPW_1)$–$(FPW_N)$ may comprise pulse width modulated signals whose pulse width is indicative of the desired amount of fuel to be injected into the corresponding engine cylinders. When gasoline is to be combusted, bi-fuel controller 50 receives signals $(FPW_1)$–$(FPW_N)$ from controller 52 and generates signals $(FPWG_1)$–$(FPWG_N)$ based on signals $(FPW_1)$–$(FPW_N)$, respectively, to drive fuel injectors 38. Alternately, when an alternate fuel is to injected by each of fuel injectors 40, bi-fuel controller 50 receives signals $(FPW_1)$–$(FPW_N)$ from controller 52 and generates signals $(FPWA_1)$–$(FPWA_N)$ based on signals $(FPW_1)$–$(FPW_N)$, respectively, to drive fuel injectors 40. Those skilled in the art will recognize that the number of fuel injector drivers 92 is preferably equal to the number of engine cylinders.

The powertrain controller 52 further includes a microprocessor 94, a read-only memory (ROM) 96, a random access memory (RAM) 98, an I/O interface 100, and a communication bus 102. As illustrated, microprocessor 94 communicates with various computer-readable storage media including ROM 96 and RAM 98. Further, microprocessor 94 communicates with various sensors and actuators (discussed above) via I/O interface 100. Communication bus 102 is provided to allow powertrain controller 52 to communicate with bi-fuel controller 50, and vice versa.

Bi-fuel controller 50 is provided to selectively control either gasoline fuel injectors 38 or AF fuel injectors 40 depending on whether gasoline or an alternate fuel is to be combusted. The bi-fuel controller 50 is also provided to control fueling systems 42, 44 as will be discussed in greater detail below. As illustrated, controller 50 includes gasoline fuel injector drivers 104, AF fuel injector drivers 106, a microprocessor 108, a ROM 110, a RAM 112, an I/O interface 88, and communication bus 102 for communicating with powertrain controller 52. As illustrated, each of fuel injector drivers 92 of powertrain controller 52 is electrically connected to a corresponding gasoline fuel injector driver 104 and AF fuel injector driver 106 in controller 50.

When gasoline is to be combusted, controller 50 energizes gasoline fuel injector drivers 104 by switching signal (PG) received by drivers 104 to a high logic level. Similarly, controller 50 can de-energize drivers 104 by switching signal (PG) to a low logic level. When drivers 104 are energized and receive signals $(FPW_1)$–$(FPW_N)$, drivers 104 generate signals $(FPWG_1)$–$(FPWG_N)$ to drive corresponding fuel injectors 38. Alternately, when drivers 104 are de-energized (e.g., during AF combustion), drivers 104 do not generate signals $(FPWG_1)$–$(FPWG_N)$ in response to signals $(FPW_1)$–$(FPW_N)$, respectively. As discussed above, signals $(FPWG_1)$–$(FPWG_N)$ preferably have the same pulse width as signals $(FPW_1)$–$(FPW_N)$, respectively.

When an alternate fuel is selected for combustion, bi-fuel controller 50 energizes AF fuel injector drivers 106 by switching signal (PA) received by drivers 106 to a high logic level. Similarly, controller 50 can de-energize drivers 106 by switching signal (PA) to a low logic level. When drivers 106 are energized and receive signals $(FPW_1)$–$(FPW_N)$, drivers 106 generate signals $(FPWA_1)$–$(FPWA_N)$ to drive corresponding fuel injectors 40. Alternately, when drivers 106 are de-energized (e.g., during gasoline combustion), drivers 106 do not generate signals $(FPWA_1)$–$(FPWA_N)$ in response to signals $(FPW_1)$–$(FPW_N)$, respectively. Signals $(FPWA_1)$–$(FPWA_N)$ preferably have the same pulse width as signals $(FPW_1)$–$(FPW_N)$, respectively. Further, the number of utilized gasoline fuel injectors 38 and AF fuel injectors 40 is preferably equal to the number of utilized drivers 92 in controller 52 and to the number of engine cylinders.

Figure 2:
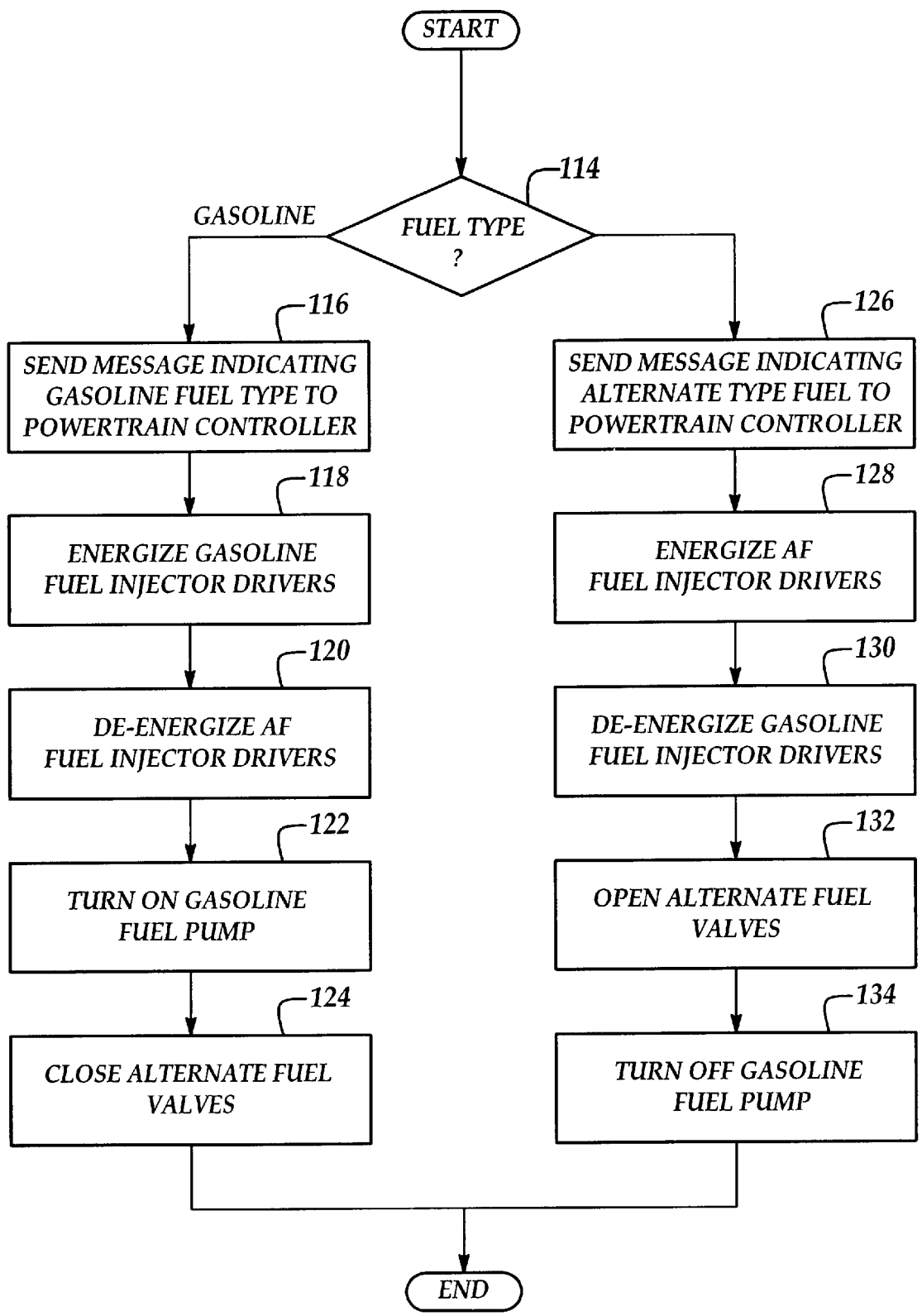
FIG. 2 is a flowchart of a method for controlling an alternate fuel system and a gasoline fuel system.

Referring to FIG. 2, the method for controlling fueling systems 42, 44 using bi-fuel controller 50 is illustrated. The method may be implemented in software that is stored in ROM 110 of controller 50. Further, the method may be executed at predetermined time intervals after ignition startup of engine 12 when controller 50 is turned on. The method includes a step 114 where a determination is made as to whether gasoline or an alternate fuel type is to be combusted in engine 12. As discussed above, controller 50 can determine a state of fuel selector switch 70 via I/O interface 88 to determine the selected fuel type.

When gasoline is selected, steps 116, 118, 120, 122, 124 are performed. At step 116, controller 50 sends a message to controller 52 via bus 102 indicating that gasoline is to be combusted. In response, controller 52 implements a fueling control strategy that utilizes gasoline fuel maps as will be discussed in greater detail below.

At step 118, controller 50 energizes gasoline fuel injector drivers 104 by switching a signal (PG) received by each driver 104 to a high logic level. When energized, drivers 104 will generate control signals $(FPWG_1)$–$(FPWG_N)$ responsive to receiving signals $(FPW_1)$–$(FPW_N)$, respectively.

At step 120, controller 50 de-energizes AF fuel injector drivers 106 by switching signal (PA) received by each of drivers 106 to a low logic level.

At step 122, controller 50 turns on gasoline fuel pump 56 by switching signal (FP) to a high logic level. In response, gasoline is provided to fuel rail 58 and fuel injector 38. Finally, at step 124, controller 50 closes fuel valves 64, 66 by switching signals $V_1$, $V_2$, respectively, to a low logic level. In response, pressured fuel in fuel tank 60 is isolated from fuel rail 68 and fuel injector 40.

Referring again to step 114, when an alternate fuel type is selected, steps 126, 128, 130, 132, 134 are performed. At step 126, controller 50 sends a message to controller 52 via bus 102 indicating that an alternate fuel type is to be combusted. In response, controller 52 implements a fueling control strategy that utilizes alternate fuel maps as will be discussed in greater detail below. Those skilled in the art will recognize that each alternate fuel type, i.e., CNG or LPG, may have distinct fuel maps.

At step 128, controller 50 energizes AF fuel injector drivers 106 by switching a signal (PA) received by each of drivers 106 to a high logic level. When energized, drivers 106 will generate control signals $(FPWA_1)$–$(FPWA_N)$ responsive to receiving signals $(FPW_1)$–$(FPW_N)$, respectively.

At step 130, controller 50 de-energizes gasoline fuel injector drivers 104 by switching a signal (PG) received by each of drivers 104 to a low logic level.

At step 132, controller 50 opens fuel valves 64, 66 by switching signals $V_1$, $V_2$, respectively, to a high logic level. In response, pressured fuel in fuel tank 60 communicates with fuel rail 68 and fuel injector 40. Finally, at step 134, controller 50 turns off gasoline fuel pump 56 by switching signal (FP) to a low logic level.

Figure 3:
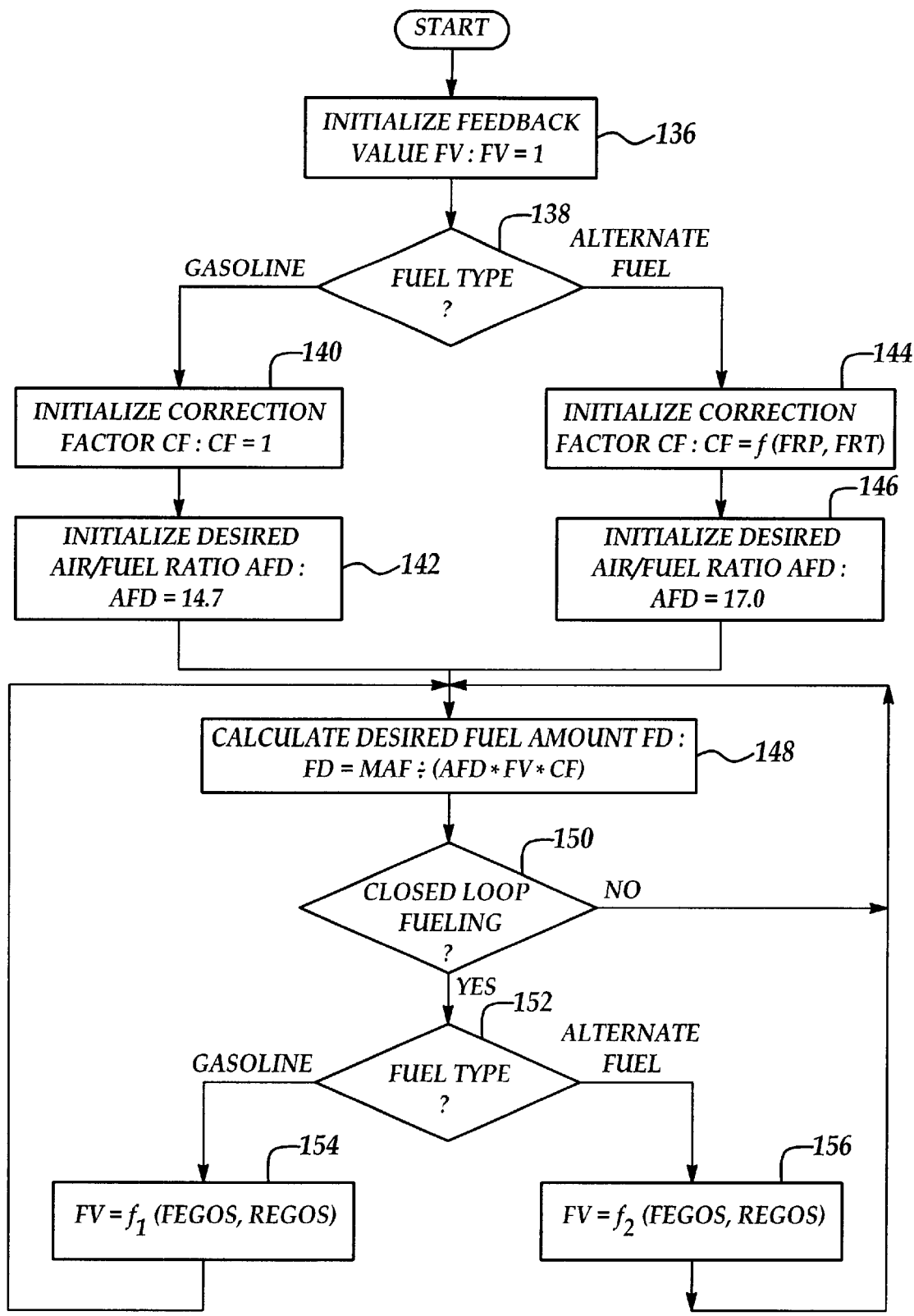
FIG. 3 is a flowchart of a method for controlling fuel delivery to the bi-fuel engine shown in FIG. 1.

Referring to FIG. 3, a method for controlling fuel delivery to the bi-fuel engine 12 is illustrated. The method may be implemented in software that is stored ROM 96 of powertrain controller 52. Further, the method may be advantageously utilized during engine crank or during closed-loop air-fuel control of engine 12.

The method includes a step 136 that initializes a air/fuel feedback variable (FV) to a value of one (i.e., FV=1). Feedback variable (FV) variable is modified during closed loop control based on signals (HEGOS) and (REGOS) from exhaust gas sensors 78, 80, respectively. After step 136, the method advances to step 138.

At step 138, a determination is made as to whether gasoline or an alternate fuel type is to be combusted in engine 12. As discussed above, bi-fuel controller 50 transmits a message to powertrain controller 52 containing the selected fuel type. Thereafter, controller 52 stores a value corresponding to the selected fuel type in RAM 98.

When a gasoline fuel type is selected at step 138, steps 140, 142 are performed. At step 140, a fuel type correction factor (CF) is initialized to a value of one (i.e., CF=1). Further, at step 142, desired air/fuel ratio Afd is set equal to a stoichiometric value (e.g., Afd=14.7) for gasoline.

Referring again to step 138, when an alternate fuel type is selected, steps 144, 146 are performed. At step 144, a fuel type correction factor CF is initialized utilizing the following equation:

$$CF=f(FRP, FRT)$$

where FRP and FRT correspond to the fuel rail pressure and fuel rail temperature, respectively, in fuel rail 68. Prior to calculating correction factor CF, bi-fuel controller 50 may transmit the values of (FRP) and (FRT) to powertrain controller 52 via communication bus 102. Further at step 146, desired air/fuel ratio Afd is set equal to a stoichiometric value (e.g., Afd=17.0) for the specific type of alternate fuel.

After either of steps 142, 146, the method advances to step 148. At step 148, a desired fuel amount Fd is calculated using the following equation:

$$Fd=MAF/(Afd*FV*FC)$$

Thereafter, controller 52 generates signals $(FPW_1)$–$(FPW_N)$ to deliver the desired fuel amount Fd to the engine cylinders. When gasoline is the selected fuel type, drivers 104 generate signals $(FPWG_1)$–$(FPWG_N)$, in response to signals $(FPW_1)$–$(FPW_N)$, respectively. The signals $(FPWG_1)$–$(FPWG_N)$ control fuel injectors 38 to inject the desired gasoline fuel amount Fd into the engine cylinders. Similarly, when an alternate fuel type is selected, drivers 106 generate signals $(FPWA_1)$–$(FPWA_N)$ in response to signals $(FPW_1)$–$(FPW_N)$, respectively. The signals $(FPWA_1)$–$(FPWA_N)$ control fuel injectors 40 to inject the desired AF fuel amount Fd into the engine cylinders.

Next at step 150, a determination is made as to whether closed-loop control is desired by monitoring engine operating conditions such as engine coolant temperature (ECT). When closed-loop control is desired, the method advances to step 152. Otherwise, the method advances back to step 148 where a new desired fuel amount Fd is calculated.

At step 152, the selected fuel type is again checked. When a gasoline fuel type is selected, step 154 calculates the air/fuel feedback variable (FV) using a first gasoline fuel map, designated as function $f_1$. The fuel map $f_1$ is indexed by the values (FEGOS) and (REGOS). Alternately, when an alternate fuel type is selected, step 156 calculates the air/fuel feedback variable using a second alternate fuel map, designated as function $f_2$. The fuel map $f_2$ is also indexed by the values (FEGOS) and (REGOS). After either of steps 154, 156, the method advances back to step 148 where a new desired fuel amount Fd is calculated.

The control system 14 and method for controlling engine 12 in accordance with the present invention provide a substantial advantage over conventional systems and methods. As discussed above, the control system 14 provides a powertrain controller 52 that generates control signals for either gasoline or alternate fuel injectors, depending on which fuel type is desired to be combusted. Thus, a common control strategy can be utilized in a single controller to control both gasoline and alternate fuel injection to meet regulated emission requirements and to improve fuel economy. Further, the bi-fuel controller 50 can be implemented as a "plug-in" module to allow powertrain controller 52 to double the number of fuel injectors that can be controlled. Thus, an existing powertrain controller 52 designed for gasoline fuel control can be readily adapted for bi-fuel control by only implementing software changes (e.g., adding additional fueling tables), and using bi-fuel controller 50.

We claim:

1. A control system for an engine that utilizes first and second fuel types, said engine having first and second fuel injectors for injecting said first and second fuel types, respectively, into an engine cylinder, said control system comprising:

a first controller including a first driver generating a first signal indicative of a desired fueling amount for one of said first and second fuel types, respectively; and a second controller receiving said first signal, said second controller including second and third drivers for controlling said first and second fuel injectors, respectively, said second driver generating a second signal for controlling an amount of said first fuel type injected by said first fuel injector based on said first signal.

2. The control system of claim 1 wherein said third driver generates a third signal for controlling an amount of said second fuel type injected by said second fuel injector into said cylinder based on said first signal.

3. The control system of claim 1 wherein said second controller is configured to determine which of said first and second fuel types is to be injected into said cylinder.

4. The control system of claim 1 wherein said second controller is configured to energize said second driver when said first fuel type is to be injected into said cylinder, said second driver receiving said first signal and generating said second signal based on said first signal.

5. The control system of claim 1 wherein said second controller is configured to energize said third driver when said second fuel type is to be injected into said cylinder, said third driver receiving said first signal and generating said third signal based on said first signal.

6. The control system of claim 1 wherein said first controller has a memory storing first and second fuel maps for said first and second fuel types, respectively, said first controller configured to determine said desired fueling amount based on one of said first and second fuel maps.

7. The control system of claim 1 wherein said first fuel type comprises gasoline or diesel fuel.

8. The control system of claim 1 wherein said second fuel type comprises one of liquefied petroleum gas, compressed natural gas, and compressed hydrogen.

9. A fuel injector controller for controlling first and second fuel injectors of an engine, said first and second fuel injectors injecting first and second fuel types, respectively, into an engine cylinder, comprising:

a first driver configured to generate a first signal for controlling said first fuel injector based on a received signal indicative of a desired fueling amount when said first driver is energized;

a second driver configured to generate a second signal for controlling said second fuel injector based on said received signal when said second driver is energized; and, a microprocessor operably coupled to said first and second drivers configured to selectively energize one of said first and second drivers.

10. The fuel injector controller of claim 9 wherein said microprocessor is further configured to select one of said first and second fuel types to be injected into said cylinder, and to selectively energize one of said first and second drivers based on said selected fuel type.

11. The control system of claim 9 wherein said first fuel type comprises gasoline or diesel fuel.

12. The control system of claim 9 wherein said second fuel type comprises one of liquefied petroleum gas, compressed natural gas, and compressed hydrogen.

13. A method of controlling an engine capable of combusting first and second fuel types, said engine having first and second fuel injectors for injecting said first and second fuel types, respectively, into an engine cylinder, comprising:

generating a first signal indicative of a desired fueling amount for one of said first and second fuel types, said first signal being generated by a first controller; and generating a second signal for controlling an amount of said first fuel type injected by said first fuel injector based on said first signal when said first fuel type is to be combusted, said second signal being generated by a second controller.

14. The method of claim 13 further comprising indicating which one of said first and second fuel types is to be injected into said cylinder.

15. The method of claim 13 wherein said step of generating said second signal includes determining said desired fueling amount from a first fuel map stored in said first controller for said first fuel type.

16. The method of claim 13 further comprising:

generating a third signal for controlling an amount of said second fuel type injected by said second fuel injector based on said first signal when said second fuel type is to be combusted, said third signal being generated by said second controller.

17. The method of claim 13 wherein said step of generating said third signal includes determining said desired fueling amount from a second fuel map stored in said first controller for said second fuel type.

18. A bi-fuel controller for controlling first and second fuel control valves providing first and second fuel types, respectively, to an engine cylinder, the controller comprising:

a microprocessor;

a first driver actuating the first fuel control valve responsive to a first received signal when said first driver is selected by said microprocessor; and, a second driver actuating the second fuel control valve responsive to the first received signal when the second driver is selected by said microprocessor.

19. A control system for an engine utilizing first and second fuel control valves for delivering first and second fuel types, respectively, to an engine cylinder, the control system comprising:

a first controller including a first driver generating a first signal indicative of a desired fueling amount for one of the first and second fuel types, respectively, and a second controller receiving said first signal, said second controller including second and third drivers for controlling said first and second fuel control valves, respectively, said second driver generating a second signal for controlling an amount of said first fuel type delivered by said first fuel control valve based on said first signal.

* * * * *